United States Patent
Lin et al.

(10) Patent No.: US 9,846,320 B2
(45) Date of Patent: Dec. 19, 2017

(54) DISPLAY DEVICE AND DRIVING METHOD THEREOF

(71) Applicant: BOE Technology Group Co., Ltd., Beijing (CN)

(72) Inventors: Chia Chiang Lin, Beijing (CN); Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/652,983

(22) PCT Filed: Dec. 4, 2014

(86) PCT No.: PCT/CN2014/093063
§ 371 (c)(1),
(2) Date: Jun. 17, 2015

(87) PCT Pub. No.: WO2016/004727
PCT Pub. Date: Jan. 14, 2016

(65) Prior Publication Data
US 2016/0282644 A1    Sep. 29, 2016

(30) Foreign Application Priority Data
Jul. 10, 2014  (CN) .......................... 2014 1 0328339

(51) Int. Cl.
*G09G 3/00*    (2006.01)
*G02F 1/13*    (2006.01)
(Continued)

(52) U.S. Cl.
CPC ...... *G02F 1/1323* (2013.01); *G02F 1/133502* (2013.01); *G09G 3/3648* (2013.01);
(Continued)

(58) Field of Classification Search
CPC ....... H04N 13/0404; H04N 13/0409–13/0415; H04N 13/0445; H04N 13/0447;
(Continued)

(56) References Cited

U.S. PATENT DOCUMENTS 5,488,496 A * 1/1996 Pine .................. G02F 1/133308
349/58
5,877,829 A * 3/1999 Okamoto .............. G02F 1/1323
349/110
(Continued)

FOREIGN PATENT DOCUMENTS

| CN | 101046949 A | 10/2007 |
|---|---|---|
| CN | 101256245 A | 9/2008 |

(Continued)

OTHER PUBLICATIONS

Apr. 25, 2016—(CN)—First Office Action Appn 201410328339.4 a with English Tran.

(Continued)

*Primary Examiner* — Roberto Flores
(74) *Attorney, Agent, or Firm* — Banner & Witcoff, Ltd.

(57) ABSTRACT

A display device and driving method thereof are disclosed. The display device includes a display screen, including a plurality of sub-pixels arranged in the form of a matrix, colors of the sub-pixels in the same column including all colors necessary for display by the display screen; a grating disposed on top of the display screen, including light-transmissive regions and light-shading regions that are arranged alternately, the light-transmissive regions being in parallel to each column of the sub-pixels; a rolling structure, located between the display screen and the grating; and a push mechanism, for pushing the grating and/or the display screen, so that relative position of the grating and the display screen is switchable between a first state and a second state, and switchover between a dual viewing field display effect (Continued)

and an anti-spy display effect is achieved for the display device.

17 Claims, 4 Drawing Sheets

(51) Int. Cl.
    *G02F 1/1335* (2006.01)
    *G09G 3/36* (2006.01)
(52) U.S. Cl.
    CPC .. *G02F 1/133512* (2013.01); *G02F 1/133514* (2013.01); *G02F 2201/305* (2013.01); *G09G 3/36* (2013.01); *G09G 2300/0452* (2013.01); *G09G 2320/068* (2013.01); *G09G 2358/00* (2013.01)
(58) Field of Classification Search
    CPC ....... H04N 13/0454; H04N 2013/0461; G02B 27/2214; G02F 1/1323; G09G 3/003; G09G 2300/0447; G09G 2320/028; G09G 2320/068; G09G 2358/00
    See application file for complete search history.

(56) References Cited

U.S. PATENT DOCUMENTS

| | | | | |
|---|---|---|---|---|
| 5,969,850 | A * | 10/1999 | Harrold | G02B 27/2214 348/E13.004 |
| 7,359,105 | B2 | 4/2008 | Jacobs et al. | |
| 2002/0158967 | A1* | 10/2002 | Janick | G02B 5/00 348/87 |
| 2007/0058258 | A1* | 3/2007 | Mather | G02B 27/2214 359/619 |
| 2007/0183015 | A1* | 8/2007 | Jacobs | G02F 1/1323 359/245 |
| 2009/0067156 | A1* | 3/2009 | Bonnett | H04N 13/0454 362/97.2 |
| 2009/0102990 | A1* | 4/2009 | Walton | G02F 1/1323 349/15 |
| 2010/0073466 | A1* | 3/2010 | Jones | H04N 13/0003 348/51 |
| 2011/0122329 | A1* | 5/2011 | Broughton | G02B 27/2214 349/15 |
| 2011/0135857 | A1* | 6/2011 | Logunov | C03C 8/08 428/34.6 |
| 2011/0234605 | A1* | 9/2011 | Smith | G02B 27/2214 345/522 |
| 2012/0050212 | A1* | 3/2012 | Yoo | G06F 3/045 345/174 |
| 2012/0105954 | A1* | 5/2012 | Prouty, IV | G02B 27/2214 359/462 |
| 2012/0154696 | A1 | 6/2012 | Koyama | |
| 2013/0155034 | A1* | 6/2013 | Nakayama | G09F 9/35 345/204 |
| 2013/0250568 | A1* | 9/2013 | Koito | F21V 9/00 362/231 |
| 2014/0232960 | A1* | 8/2014 | Schwartz | G02B 26/004 349/12 |
| 2014/0295150 | A1* | 10/2014 | Bower | C09J 7/02 428/201 |
| 2015/0138457 | A1* | 5/2015 | Kroon | H04N 13/0404 349/15 |
| 2015/0193625 | A1* | 7/2015 | Sumi | G06F 21/60 345/697 |

FOREIGN PATENT DOCUMENTS

| | | |
|---|---|---|
| CN | 101915997 A | 12/2010 |
| CN | 101988998 A | 3/2011 |
| CN | 102812510 A | 12/2012 |
| CN | 103165087 A | 6/2013 |
| CN | 203275830 U | 11/2013 |
| CN | 104090417 A | 10/2014 |
| KR | 20080058974 A | 6/2008 |
| KR | 101322031 B1 | 10/2013 |

OTHER PUBLICATIONS

Mar. 30, 2015—(PCT) Written Opinion of ISA—App. PCT/CN2014/093063—Eng. Tran.

* cited by examiner

DISPLAY DEVICE AND DRIVING METHOD THEREOF

The application is a U.S. National Phase Entry of International Application No. PCT/CN2014/093063 filed on Dec. 4, 2014, designating the United States of America and claiming priority to Chinese Patent Application No. 201410328339.4, filed on Jul. 10, 2014. The present application claims priority to and the benefit of the above-identified applications and the above-identified applications are incorporated by reference herein in their entirety.

TECHNICAL FIELD

Embodiments of the present invention relate to a display device and a driving method thereof.

BACKGROUND

With the continuous development of display technology, flat display devices have become able to achieve various display functions, such as, dual viewing field display, anti-spy display, 3D display, etc.

Dual viewing field display refers to such a display technology that different images can be seen on two different sides (e.g., left and right sides) of the same display device. For the existing dual viewing field display technology, a dual viewing field display is realized mainly in such a way that a grating is disposed in front of a display screen, and light-transmissive regions and light-shading regions that are arranged alternately on the grating are utilized for separating light for displaying to both sides of the display screen, so as to make observers on both sides see different pixels.

In the anti-spy display technology, by means of arranging a grating in front of a display screen, the normal display region can be only confined to a narrower region having frontal viewing angles. Only within a certain view-angle range (for example, the viewing angle is smaller than 60 degrees), a normally displayed image can be watched by an observer, and once the viewing angle exceeds this range (for example, the viewing angle is larger than 60 degrees), the observed image becomes an all-black picture. This technology has a certain role in protecting privacy.

SUMMARY

According to embodiments of the present invention, there are provided a display device having double functions of dual viewing field display and anti-spy display, and a driving method thereof.

According to at least one embodiment of the invention, there is provided a display device, which includes a display screen, including a plurality of sub-pixels arranged in the form of a matrix, colors of the sub-pixels in the same column including all colors necessary for display by the display screen; a grating, disposed on top of the display screen, and including light-transmissive regions and light-shading regions that are arranged alternately, the light-transmissive regions being each in parallel to columns of the sub-pixels; a rolling structure, located between the display screen and the grating; and a push mechanism, for pushing the grating and/or the display screen, so that relative position of the grating and the display screen is switchable between a first state and a second state. The first state is that, the vertical projection of each of the light-transmissive regions on the display screen stretches across corresponding two columns of the sub-pixels that are adjacent, and completely or partially overlap with areas where the corresponding two columns of the sub-pixels that are adjacent are located; the second state is that, the vertical projection of each of the light-transmissive regions on the display screen completely or partially overlaps with areas where merely corresponding one column of the sub-pixels are located.

For example, in the course of switching relative position of the grating and the display screen between the first state and the second state, positions of the grating and/or the display screen along a direction parallel to the plane where the sub-pixels are located are different.

For example, a variance amount of movement of the grating and/or the display screen along a direction parallel to the plane where the sub-pixels are located may be half of a column width of the sub-pixels.

For example, the display device may further include a flexible sealant for bonding the display screen and the grating together.

For example, the display device may further include a filling liquid filled between the display screen and the grating.

For example, a refractive index of the filling liquid is equal to a refractive index of the display screen.

For example, the rolling structure may comprise sphere bodies, ellipsoid bodies or cylinder bodies.

For example, the rolling structure may comprise spherical spacers.

For example, the rolling structure is evenly distributed between the display screen and the grating.

For example, the grain diameter of the rolling structure is on the order of micrometers.

For example, the push mechanism may include a mechanical arm for pushing the grating and/or the display screen; a motor connected to the mechanical arm, configured for providing an action of the mechanical arm with power.

For example, the push mechanism may include a plurality of mechanical arms, and the plurality of mechanical arms are each located on one of two opposite sides of the display device.

For example, the push mechanism may further include a control circuit connected to the motor, configured for allowing the motor to drive the mechanical arm to push the grating and/or the display screen by its control, so that the grating and the display screen are made to stay in the first state when a dual viewing field display effect needs to be performed by the display device, and the grating and the display screen are made to stay in the second state when an anti-spy display effect needs to be performed by the display device.

According to an embodiment of the invention, there is further provided a driving method of a display device, for driving the display device as stated in any of above items, the driving method comprising: allowing the display device to stay in a first state when a dual viewing field display effect needs to be performed by the display device, the plurality of sub-pixels including first sub-pixels and second sub-pixels, applying signals that belong to different images to the first sub-pixels and the second sub-pixels, respectively; allowing the display device to stay in a second state when an anti-spy display effect needs to be performed by the display device, applying signals that belong to the same image to the plurality of sub-pixels. The first state is that, the vertical projection of each of the light-transmissive regions on the display screen stretches across corresponding two columns of the sub-pixels that are adjacent, and completely or partially overlap with areas where the corresponding two columns of the sub-pixels that are adjacent are located; the second state is that, the vertical projection of each of the light-transmissive regions on the display screen completely or partially overlaps with areas where merely corresponding one column of the sub-pixels are located.

BRIEF DESCRIPTION OF THE DRAWINGS

In order to illustrate the technical solution of the embodiments of the invention more clearly, the drawings that need to be used in the embodiments will be briefly described below; it is obvious that the drawings as described below are only related to some embodiments of the invention, and for those ordinarily skilled in the art, other drawings can also be obtained based on these drawings without creative work.

REFERENCE NUMERALS

10—display screen; 11—grating; 12—rolling structure; 13—filling liquid; 15—flexible sealant; 101—a first substrate; 102—thin film transistors; 103—liquid crystals; 104—spacers; 105—sub-pixels; 106—black matrix; 107—second substrate; 111—third substrate; 112—light-shading regions; 113—light-transmissive regions; 30—push mechanism; 301—mechanical arm; 302—motor; 303—control circuit; 1051—first sub-pixels; 1052—second sub-pixels.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

As noticed by inventors in research, with reference to the display technologies for different functions, how to integrate the variety of functions into a display device becomes one of research directions in the related field.

Figure 1:
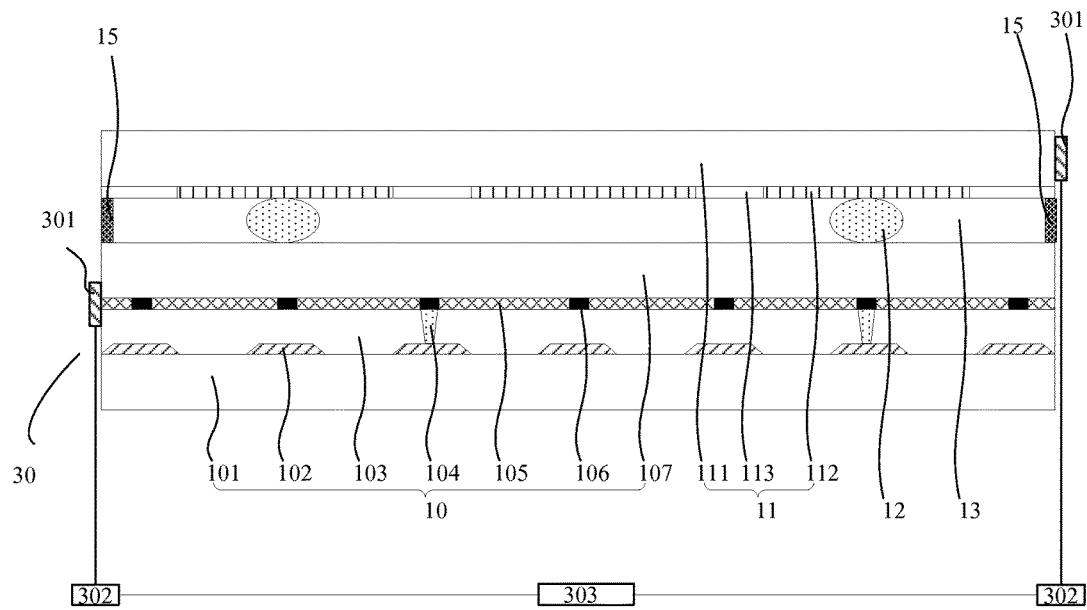
FIG. 1 is a structural view illustrating a display device provided by an embodiment of the invention.

According to an embodiment, there is provided a display device. As shown in FIG. 1, the display device includes a display screen 10, a grating 11, a rolling structure 12 and a push mechanism 30. The display screen 10 includes a plurality of sub-pixels 105 arranged in the form of a matrix, the colors of sub-pixels 105 within a same column includes all colors necessary for display by the display screen 10; the grating 11 is disposed over the display screen 10, the grating 11 includes light-transmissive regions 113, in parallel to each column of sub-pixels 105, and light-shading regions 112, and the light-transmissive regions and the light-shading regions are arranged alternately; the rolling structure 12 is located between the display screen 10 and the grating 11; the push mechanism 30 is configured for pushing the grating 11 and/or the display screen 10, so that the relative position between the grating 11 and the display screen 10 is switched between a first state and a second state, and so switchover between a dual viewing field display effect and an anti-spy display effect is realized for the display device.

Among the present disclosure, the first state may involve the cases where the vertical projection of a light-transmissive region 113 on the display screen 10 stretches across two adjacent columns of sub-pixels 105, and partially or fully overlaps with areas where the two adjacent columns of sub-pixels 105 are located. The second state may involve the case where the vertical projection of a light-transmissive region 113 on the display screen 10 partially or fully overlaps with the area where only one column of sub-pixels 105 is located.

It should be noted that, the above-stated "light-transmissive region 113" may be a gap region between adjacent light-shading regions 112 (as denoted by the grating 11 in FIG. 1); or the above-stated "light-transmissive region 113" may also be of a stripe that is formed within a gap region between adjacent light-shading regions 112 and formed from a transparent material. In addition, "above the display screen" involves one side of the display screen 10 on which images are displayed.

Figure 2:
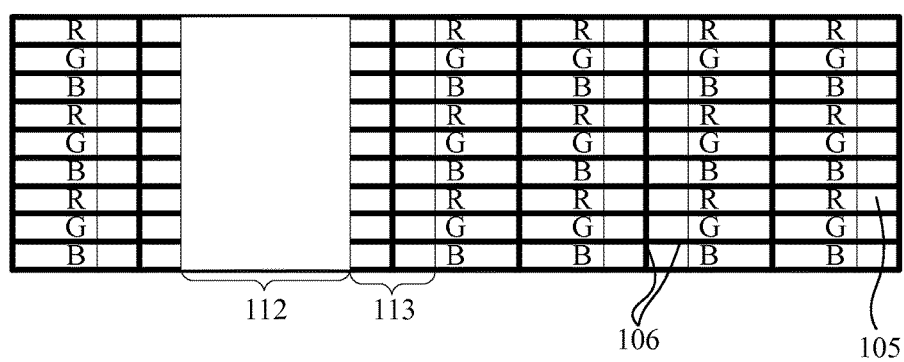
FIG. 2 is a perspective plan view illustrating a grating and a display screen of a display device provided by an embodiment of the invention upon dual field-of-view display.

In the above display device, when it is required that dual viewing field display effect be performed with the display device, the relative position between the grating 11 and the display screen 10 is at the first state. Namely, the projection of a light-transmissive region 113 on the display screen 10 stretches across two adjacent columns of sub-pixels 105, and partially or fully overlaps with areas where the two adjacent columns of sub-pixels 105 are located. A perspective plan view of the grating 11 and the display screen 10 may be that as shown in FIG. 2. Because the colors of each column of sub-pixels 105 in the embodiment include all colors (e.g., red (R), green (G) and blue (B)) necessary for display of the display screen 10, the colors of sub-pixels exposed by each light-transmissive region 113 is not the same, but include all colors of sub-pixels. Thus, the display can be performed.

Figure 3:
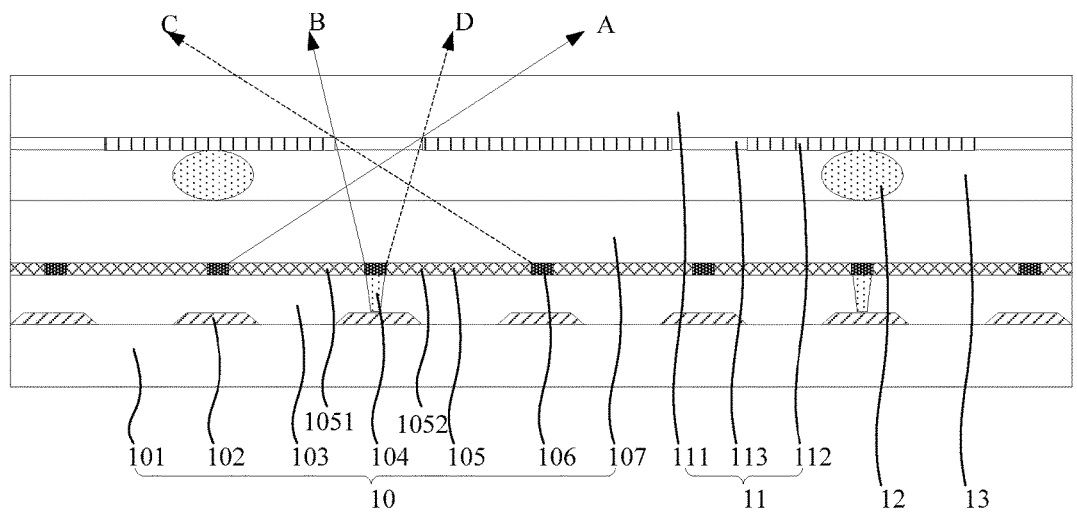
FIG. 3 is a diagram illustrating the light path of a display device provided by an embodiment of the invention during dual viewing field display.

In this example, the light-path diagram of the display device may be that as shown in FIG. 3. Taking the configuration for realizing left-right dual viewing field display effect as an example, light rays A and B denote that, when watch is conducted from the right side of the display device, sub-pixels that can be seen are sub-pixels on the left side of the sub-pixels 105 in two columns that are exposed by a light-transmissive region 113; light rays C and D denote that, when watch is conducted from the left side of the display device, sub-pixels that can be seen are sub-pixels on the right side of sub-pixels 105 in two columns that are exposed by a light-transmissive region 113. At this time, signals for displaying different images are applied to sub-pixels on the left side and sub-pixels on the right side, respectively, so that different images can be presented for viewing angles on two sides of the display device. Thus, the dual viewing field display effect is achieved.

It should be noted that, with a central line of the display device parallel to a column of sub-pixels 105 as a borderline, the left side of the borderline is the "left side" as stated in the embodiment, and the right side of the borderline is the "right side" as stated in the embodiment.

Figure 4:
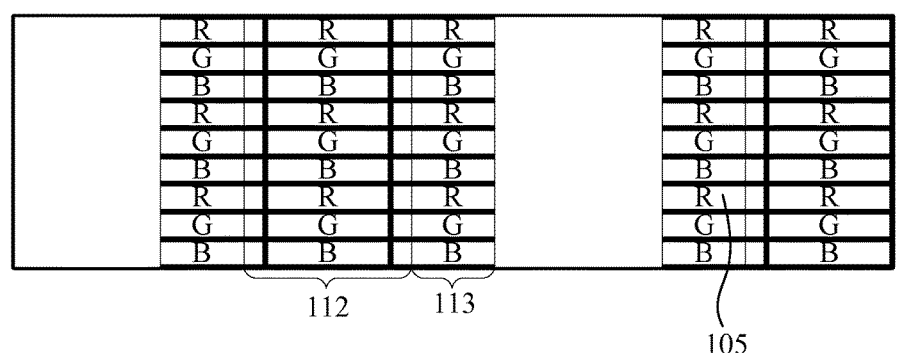
FIG. 4 is a perspective plan view illustrating a grating and a display screen of a display device provided by an embodiment of the invention during anti-spy display.

Additionally, dual viewing field display effect at other viewing angles may also be realized by the display devices in other embodiments of the invention. In this regard, the effect can be obtained by those skilled in the art on the basis of the display device provided by the embodiment, and details are omitted here.

Where anti-spy display effect is needed with the display device, the relative position between the grating 11 and the display screen 10 is at the second state. Namely, the vertical projection of a light-transmissive region 113 on the display screen 10 partially or fully overlaps with the area where merely one column of sub-pixels 105 is located. For example, a perspective plan of the grating 11 and the display screen 10 may be that as shown in FIG. 4. Only one column of sub-pixels 105 is exposed by a light-transmissive region 113 between two adjacent light-shading regions 112, and sub-pixels in the columns on both sides of the exposed sub-pixels 105 are each sheltered by a light-shading region 112. Because the colors of each column of sub-pixels 105 in the embodiment include all colors (e.g., red (R), green (G) and blue (B)) necessary for display of the display screen 10, the colors of exposed sub-pixels is not the same, but include all colors of sub-pixels. Thus, the display function can be realized.

Figure 5:
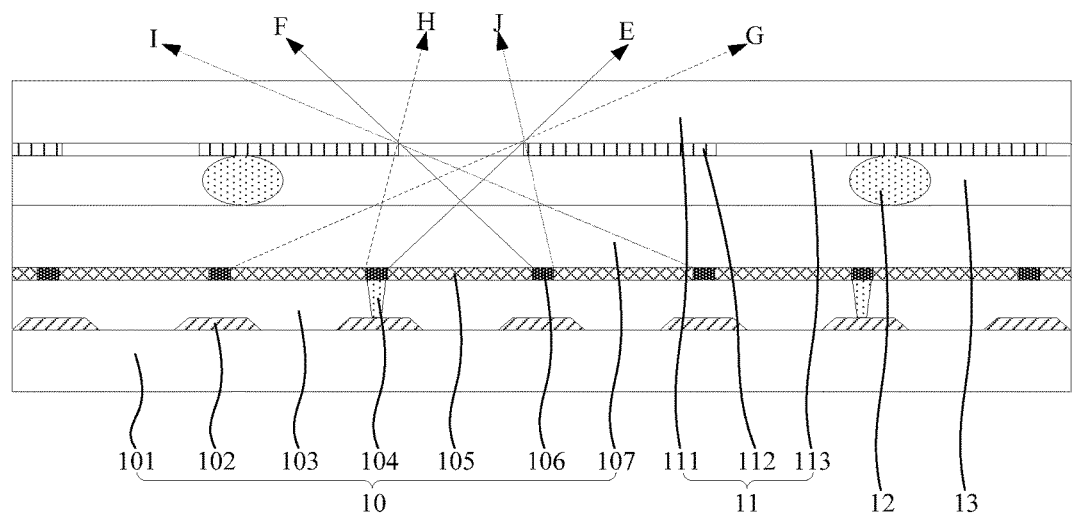
FIG. 5 is a diagram illustrating the light path of a display device provided by an embodiment of the invention during anti-spy display.

In this example, the light-path diagram of the display device may be that as shown in FIG. 5. Taking the configuration for realizing anti-spy display at side viewing angles as an example, light rays E and F denote that, when the display device is laterally observed from zero view-angle and within a smaller view-angle range around the zero view-angle, sub-pixels that can be seen are sub-pixels 105 in a row that are exposed by a light-transmissive region 113. Light rays H and G denote that, when the display device is observed within a larger view-angle range from the right side, sub-pixels located on the left side of the exposed sub-pixels 105 in one column cannot be seen due to complete shielding by a light-shading region 112. Light rays I and J denote that, when the display device is observed within a larger view-angle range from the left side, sub-pixels located on the right side of the exposed sub-pixels 105 in one column cannot be seen due to complete shielding by a light-shading region 112. Signals belonging to the same image are applied to all sub-pixels 105 of the display device, so that the displayed image can be observed merely at zero view-angle and within a smaller view-angle range around the zero view-angle. But when the side view-angle is larger than a certain angle, the image cannot be observed, thereby realizing the anti-spy display effect.

It should be noted that, the "viewing angle" as stated in the embodiment is an angle between a line of sight for observing and a straight line perpendicular to the plane where multiple sub-pixels are located. When the display device is frontally viewed, the line of sight is perpendicular to the plane where multiple sub-pixels are located, and the viewing angle is zero.

In summary, the display device provided by an embodiment of the invention is based on a dual viewing field display device and an anti-spy display device which each have a grating provided therein, and the structure of the gratings may be the same. A rolling structure 12 that can be rolled is provided between the display screen 10 and the grating 11, and a push mechanism 30 is configured for pushing the display screen 10 and/or the grating 11, so that the relative position between the two members is switchable between a first state and a second state. Because the dual viewing field display effect can be realized in the first state, and the anti-spy display effect can be realized in the second state, switchover between the dual viewing field display effect and the anti-spy display effect can be realized for the display device in an embodiment of the invention according to requirements. Consequently, a demand of integrating a variety of functions into a display device is met.

In the above display device, during switchover of the relative position of the grating 11 and the display screen 10 between a first state and a second state, the grating 11 and/or the display screen 10 may move along a direction in parallel to the plane where sub-pixels are located. For example, when the display screen is placed horizontally and does not move, the grating may be moved to left and right in a direction parallel to the display screen, so as to achieve switchover between the first state and the second state.

For example, during switchover of the relative position of the grating 11 and the display screen 10 between the first state and the second state, the grating 11 and/or the display screen 10 may move along a direction in parallel to the plane where sub-pixels are located, so as to guarantee rapid execution of the switching.

If the relative position between the grating 11 and the display screen 10 is switched between a first state and a second state, the embodiment does not limit variance degree in relative position of the two members. For example, the variance degree of the movement of the grating 11 and/or the display screen 10 along a direction parallel to the plane where sub-pixels are located (namely, the variance degree in relative position) may be a half of the column width of sub-pixels. In other embodiments of the invention, the variance degree in relative position between the grating 11 and the display screen 10 may also be three seconds (3/2), five seconds (5/2) or any other multiple of the column width of sub-pixels.

For example, the display device provided by the embodiment may further include a flexible sealant 15 for bonding the display screen 10 and the grating 11. The flexible sealant 15 has an adhesive force and flexibility, and can guarantee that the display device has a good sealing property on the premise that relative movement between the grating 11 and the display screen 10 can be realized.

For example, sealant that available in the market place and meet the requirements may be elected as the flexible sealant 15, and it may also be prepared according to requirements in practice. For example, in view of the flexibility of rubber, rubber may be mixed with other glue having a stronger adhesive force to form the desired flexible sealant, etc.

The embodiments do not limit the specific form/configuration of the rolling structure 12, and for example, it may comprise sphere bodies, ellipsoid bodies or cylinder bodies. When it is a cylinder, the curved face of the cylinder contacts the grating 11 and the display screen 10.

For example, for the sake of realizing that the friction force resisting the relative movement between the display screen 10 and the grating 11 is smaller and the relative movement is smoother, the rolling structure 12 may be evenly distributed between the display screen 10 and the grating 11.

For example, in the embodiment, the grain diameter of the rolling structure 12 may be on the order of micrometers, so that the thickness of the display device is thinner.

The rolling structure 12 has a function of guaranteeing the smooth performance of relative movement between the display screen 10 and the grating 11, and in addition, it is configured to maintain the distance (cell thickness) between the display screen 10 and the grating 11. For example, the rolling structure 12 may be spherical spacers, so as to guarantee the uniformity in thickness of the display device.

For example, the setting method of the rolling structure 12 may be conducted in the following way. For example, a flexible sealant is disposed at the edge of the display screen 10 or the grating 11, a rolling structure 12 is evenly arranged in the space enclosed by the flexible sealant by way of spraying or the like, and then, the display screen 10 and the grating 11 are bonded together with the flexible sealant, so that the rolling structure 12 is encapsulated in the space formed by the display screen 10, the grating 11 and the flexible sealant.

For example, the display device provided by the embodiment may further include a filling liquid 13 filled between the display screen 10 and the grating 11, so as to enhance the mobility of the rolling structure 12 between the display screen 10 and the grating 11, and to further reduce the friction force resisting the relative movement between the display screen 10 and the grating 11.

Further, for example, the refractive index of the filling liquid may be equal to the refractive index of the display screen 10 (in the embodiment, the term "equal" may be absolutely equal or approximately equal, as long as visual effects are not affected significantly), so as to ensure that there is no loss of light when light from the display screen 10 goes through the filling liquid between the display screen 10 and the grating 11 (e.g., without refraction of light). Thus, the light transmissivity is improved. As the majority of the thickness of the display screen 10 is the thicknesses of the first substrate 101 and the second substrate 107, which are usually of glass, the refraction index of the filling liquid may be the same as or similar to the refraction index of glass.

It should be noted that, the embodiment does not limit to the way for fabricating the above-mentioned display device filled with a filling liquid. For example, it is possible that firstly, rolling structures 12 are formed on a second substrate 107, then a display screen 10 is prepared with the second substrate 107 with the rolling structures 12 formed on one side thereof, and a grating 11 is prepared; next, a flexible sealant 15 in the shape of '□' is formed on the display screen 10 or the grating 11 along the edge of a display region, and has an opening thereon; afterwards, a filling liquid is injected inside the space surrounded by the flexible sealant, and the opening of the flexible sealant is sealed after the end of the injecting process; finally, the display screen 10 and the grating 11 are bonded with the flexible sealant, so as to complete the encapsulation. The shape of the flexible sealant 15 may be changed according to the shape of the display device, and is not necessarily in the shape of '□'. For another example, the rolling structure may not be formed on the second substrate 107, but after a display screen 10 and a grating 11 are prepared respectively and a flexible sealant having an opening is formed, rolling structures 12 and a filling liquid are stirred evenly, and then the filling liquid uniformly mixed with the rolling structures 12 is injected inside the flexible sealant, thereby completing the encapsulation.

The embodiments do not limit the specific implementation form of the push mechanism provided in the display device. For example, the push mechanism 30 may include a mechanical arm 301 for pushing the grating 11 and/or the display screen 10; a motor 302 connected to the mechanical arm, the motor 302 acting to provide power for motion of the mechanical arm 301

Based on the specific implementation form of the push mechanism, according to actual design requirements of the display device, the mechanical arm 301 can be disposed at a peripheral side of the grating 11, or the mechanical arm 301 is disposed at a peripheral side of the display screen 10, or peripheral sides of the grating 11 and the display screen 10 are each provided with a mechanical arm 301. As for the former two modes, the amount of relevant elements can be reduced, thereby simplifying internal structure of the display device.

The grating 11 may include only one substrate, the display screen 10 includes at least two substrates, while the ratio of weight of each substrate in the total weight of the corresponding member is large. Therefore, in the course of causing the display screen 10 and the grating 11 to move relatively, such a mode in which the grating 11 is pushed and the display screen 10 is not pushed requires less power than such a mode in which the display screen 10 is pushed and the grating 11 is not pushed, and in turn, the motor for providing power is smaller in volume. Consequently, in the embodiment, by means of arranging a mechanical arm at a peripheral side of the grating 11 for pushing the grating 11, the thickness and weight of the display device can be further decreased, thereby simplifying the internal structure of the display device.

As for the mode in which the peripheral sides of the grating 11 and the display screen 10 are each provided with a mechanical arm 301, a mechanical arm 301 disposed at a peripheral side of the grating 11 and a mechanical arm 301 disposed at a peripheral side of the display screen 10 are located on two opposite sides of the display device, respectively, and this configuration enables the grating 11 and the display screen 10 to move simultaneously. Thus, it is ensured that relative position of the two is changed to the desired relative position more rapidly, and the speed of switching between dual viewing field display effect and anti-spy display effect is raised.

The embodiments do not limit the number of the provided mechanical arms, and it may be one or more. Preferably, a plurality of mechanical arms may be evenly arranged at the same side of the display device, so as to ensure that the same side of the pushed grating 11 or display screen 10 is forced evenly, and the direction of movement is not deviated.

If the mechanical arm can push the grating 11 and/or the display screen 10 only toward a direction, then mechanical arms may be disposed on two opposite sides of a display device, respectively. Thus, if a dual viewing field display effect needs to be performed, a mechanical arm on one side of them is used to push the grating 11 and/or the display screen 10 to a designated location, while if an anti-spy display effect needs to be performed, a mechanical arm on the other side is used to push the grating 11 and/or the display screen 10 back to an original location. For another example, the push mechanism may include a plurality of mechanical arms, which are each located on one of two opposite sides of a display device, so as to smoothly complete switchover between two functions on the premise that deviation in the direction of movement of the pushed grating 11 or display screen 10 does not occur.

In addition, for example, the connecting relationship between the mechanical arm and the motor may be determined according to the size of power that can be provided by a single motor, the actual volume and weight of a motor, the desired thickness and weight of the display device, and other factors. In the embodiment, one mechanical arm may be connected to one motor on a one-to-one basis, or a plurality of mechanical arms is connected to one motor. For example, mechanical arms disposed on the same side may be connected to the same motor, etc.

In the display device provided by the embodiment, for example, the push mechanism 30 may further include a control circuit 303 connected to the motor 302, and the control circuit 303 acts to make the motor 302 drive the mechanical arm 301 to push the grating 11 and/or the display screen 10. Thus, if dual viewing field display effect needs to be performed by the display device, the grating 11 and the display screen 10 are in a first state, while if an anti-spy display effect needs to be performed by the display device, the grating 11 and the display screen 10 are in a second state. For example, the above control circuit 301 may be provided separately, and may also be integrated with peripheral driving circuits of the display device, so as to enhance the integration level of the display device, and to further simplify structure of the display device.

It should be noted that, the display screen 10 in the embodiment may be a liquid crystal display screen, a LED (Light Emitting Diode) display screen, or a display screen of other type. Taking the display screen 10 which is a liquid crystal display screen as an example, the construction of the display screen 10 may be that as shown in FIG. 1. It includes a first substrate 101; TFTs 102 or other array circuit structure formed on the first substrate 101; a second substrate 107 disposed in opposition to the first substrate 101; sub-pixels 105 and a black matrix 106 that are formed on the second substrate 107 (the black matrix 106 takes the shape of a grid, and only a part of the black matrix in parallel to a column of sub-pixels 105 is shown in FIG. 1); liquid crystals 103 filled between the first substrate 101 and the second substrate 107; and spacers 104, configured for maintaining a certain spacing between the first substrate 101 and the second substrate 107.

For example, arrangement of sub-pixels 105 on the display screen 10 may be those as shown in FIG. 2 and FIG. 3. The display screen 10 includes sub-pixels 105 in multiple columns that are arranged in parallel, and sub-pixels 105 in each column are uniformly arranged in RGB order. Adjacent sub-pixels in three colors of R, G and B form one pixel, and sub-pixels contained in each row of sub-pixels 105 along a direction perpendicular to light-transmissive regions 113 have the same color. If the size of a sub-pixel 105 along a direction parallel to light-transmissive regions 113 is called as a first length, and the size of the sub-pixel 105 along a direction perpendicular to light-transmissive regions 113 is called as a second length, then the first length of sub-pixels 105 shown in FIG. 2 and FIG. 3 is smaller than the second length thereof.

Figure 6:
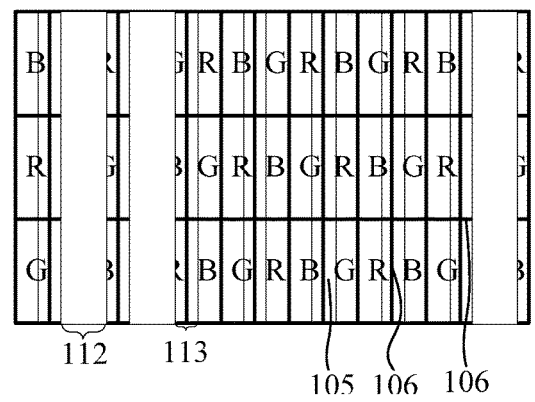
FIG. 6 is a perspective plan view illustrating a grating and a display screen in correspondence with dual viewing field display, when sub-pixels of a display device provided by another embodiment of the invention are arranged in another manner.
Figure 7:
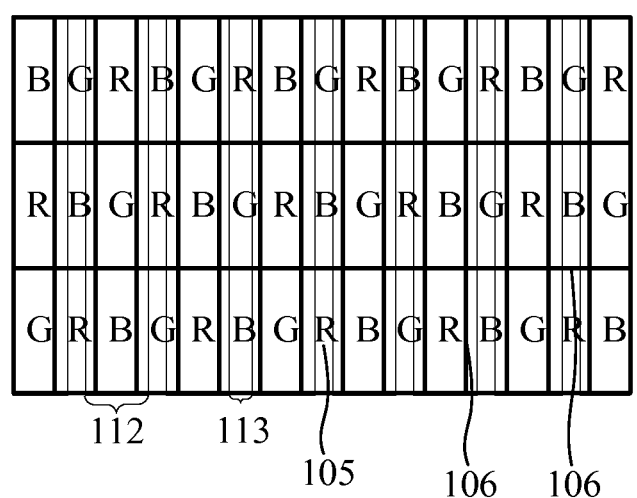
FIG. 7 is a perspective plan view illustrating a grating and a display screen in correspondence with anti-spy display, when sub-pixels of a display device provided by another embodiment of the invention are arranged in another manner.

In other embodiments of the invention, arrangement of sub-pixels 105 on a display screen 10 may also be in other arranging forms. For example, as shown in FIG. 6 and FIG. 7, the first length of sub-pixels 105 is larger than the second length thereof, each column of sub-pixels is parallel to light-transmissive regions 113, and each column of sub-pixels includes sub-pixels in three colors of R, G and B. Sub-pixels in each row along a direction perpendicular to light-transmissive regions 113 are uniformly arranged in BGR order. FIG. 6 is a perspective plan view illustrating a grating 11 and a display screen 10 for realizing a corresponding dual viewing field display when sub-pixels 105 are arranged in the above form. A vertical projection of a light-transmissive region 113 on the display screen 10 stretches across two adjacent columns of sub-pixels 105, and completely or partially overlaps with areas where the two adjacent columns of sub-pixels 105 are located, and two columns of sub-pixels exposed by it each have three colors of R, G and B. When the display device is observed from two sides, respectively, sub-pixels in different columns, of the exposed sub-pixels in two columns, can be seen, that is, different images can be seen. FIG. 7 is a perspective plan view illustrating a grating 11 and a display screen 10 for a corresponding anti-spy display when sub-pixels 105 are arranged in the above form. A vertical projection of a light-transmissive region 113 on the display screen 10 completely or partially overlaps with the area where only one column of sub-pixels 105 is located, and only one column of sub-pixels is exposed. Sub-pixels on both sides of the exposed sub-pixels in the column are each sheltered by a light-shading region 112, so that an image can be seen clearly only when the viewing angle is smaller, and an observed image from a side at a larger viewing angle is all black.

In addition, it should be noted that, the configuration of the grating 11 in the display device provided in the embodiment may be that as shown in FIG. 1. It includes a third substrate 111; light-shading regions 112 and light-transmissive regions 113 formed on the third substrate 111. A light-transmissive region 113 may be a transparent film layer formed between two adjacent light-shading regions 112, or it may be formed as a gap between two adjacent light-shading regions 112. For example, in other embodiment of the invention, it may also be possible that a fourth substrate is disposed on a side of the light-shading regions 112 and the light-transmissive regions 113 facing away from the third substrate, so as to prevent damages to the light-shading regions 112 and the light-transmissive regions 113 by the rolling structure 12. Thus, good optical properties of the grating are insured.

According to an embodiment, there is further provided a driving method of a display device, for driving the display device as stated in any of above embodiments. The driving method includes that, when a dual viewing field display effect needs to be realized by a display device, the display device is allowed to stay in a first state, a plurality of sub-pixels includes first sub-pixels 1051 and second sub-pixels 1052, and signals belonging to different images are applied to the first sub-pixels 1051 and the second sub-pixels 1052, respectively; when an anti-spy display effect needs to be realized by the display device, the display device is allowed to stay in a second state, and signals belonging to the same image are applied to the plurality of sub-pixels.

In the first state, the vertical projection of a light-transmissive region 113 on the display screen 10 stretches across two adjacent columns of sub-pixels 105, and partially or fully overlaps with areas where the two adjacent columns of sub-pixels 105 are located. In the second state, the vertical projection of a light-transmissive region 113 on the display screen 10 partially or fully overlaps with the area where only one column of sub-pixels 105 is located.

By the above driving method, relative replacement occurs between the grating 11 and the display screen 10, so that relative position of the grating 11 and the display screen 10 is switched between the first state and the second state. Thus, switchover between dual viewing field display effect and anti-spy display effect is achieved for the display device.

It should be noted that, when the display device is conducting dual viewing field display, because image signals applied to sub-pixels within different areas are different, a display face can be divided into a plurality of first display areas and a plurality of second display areas. The plurality of first display areas and the plurality of second display areas are arranged alternately with each other, the first sub-pixels belong to the first display areas, and the second sub-pixels belong to the second display area. Among sub-pixels in the two columns, across which the vertical projection of each light-transmissive region 113 on the display screen 10 is stretched, sub-pixels in one column are first sub-pixels and belong to the first display area, and sub-pixels in the other column are second sub-pixels and belong to the second display area. Thus, it is ensured that different images are observed on two opposite sides of the display device.

In the display device and driving method thereof provided by embodiments of the invention, by means of arranging a rolling structure between a display screen and a grating that are laminated, relative displacement can occur between the display screen and the grating. Thus, if a dual viewing field display effect needs to be performed by the display device, the dual viewing field display effect can be achieved in such a way that a push mechanism for pushing the display screen and/or the grating and allow the vertical projection of a light-transmissive region of the grating on the display screen to stretch across two adjacent columns of sub-pixels, and if an anti-spy display effect needs to be performed by the display device, the anti-spy display effect is achieved in such a way that the vertical projection of a light-transmissive region of the grating on the display screen is allowed to cover only one column of sub-pixels with a push of the display screen and/or the grating by a push mechanism. As can be seen, the display device in embodiments of the invention has dual functions of realizing a dual viewing field display effect and an anti-spy display effect, and is usable for achieving switchover between dual viewing field and anti-spy according to requirements. Consequently, people's demand of integrating a variety of functions into one display device is met.

Descriptions made above are merely exemplary embodiments of the invention, but are not used to limit the protection scope of the invention. The protection scope of the invention is determined by attached claims.

This application claims the benefit of priority from Chinese patent application No. 201410328339.4, filed on Jul. 10, 2014, the disclosure of which is incorporated herein in its entirety by reference as a part of the present application.

What is claimed is:

1. A display device, comprising:
a display screen, including a plurality of sub-pixels arranged in a form of a matrix, colors of the sub-pixels in a same column including all colors necessary for display by the display screen;
a grating, disposed on top of the display screen, including light-transmissive regions and light-shading regions that are arranged alternately, the light-transmissive regions being each in parallel to columns of the sub-pixels;
a rolling structure, located between the display screen and the grating; and
a push mechanism, configured to push the grating and the display screen to switch a relative position of the grating and the display screen between a first state for dual viewing field display and a second state for anti-spy display,
wherein, during the first state for the dual viewing field display, two different images are observed on a left side and a right side of the display device, respectively,
wherein the rolling structure is configured to reduce a friction force generated by a relative movement between the display screen and the grating, wherein, in the first state, a vertical projection of each of the light-transmissive regions on the display screen stretches across two corresponding columns of the sub-pixels that are adjacent, and completely or partially overlaps with areas where the two corresponding columns of the sub-pixels that are adjacent are located,
wherein, in the second state, a vertical projection of each of the light-transmissive regions on the display screen completely or partially overlaps with areas where only one corresponding column of the sub-pixels is located, and
wherein the push mechanism includes a first mechanical arm located on a first side of the grating and a second mechanical arm located on a second side of the display screen that are configured together to push the grating and the display screen to move simultaneously, and the first side of the grating and the second side of the display screen are respectively on two opposite sides of the display device.

2. The display device claimed as claim 1, wherein, in switching the relative position of the grating and the display screen between the first state and the second state, positions of the grating and the display screen along a direction parallel to a plane where the sub-pixels are located become different.

3. The display device claimed as claim 2, wherein, a variance amount of movement of the grating and the display screen along the direction parallel to the plane where the sub-pixels are located is N times of a half of a column width of the sub-pixels, and N is an odd integer.

4. The display device claimed as claim 2, further comprising a flexible sealant for bonding the display screen and the grating together.

5. The display device claimed as claim 2, further comprising a filling liquid filled between the display screen and the grating.

6. The display device claimed as claim 2, wherein the rolling structure comprises spherical spacers.

7. The display device claimed as claim 1, further comprising a flexible sealant for bonding the display screen and the grating together.

8. The display device claimed as claim 1, further comprising a filling liquid filled between the display screen and the grating.

9. The display device claimed as claim 8, wherein, a refractive index of the filling liquid is equal to a refractive index of the display screen.

10. The display device claimed as claim 1, wherein the rolling structure comprises sphere bodies, ellipsoid bodies or cylinder bodies.

11. The display device claimed as claim 1, wherein the rolling structure comprises spherical spacers.

12. The display device claimed as claim 1, wherein the rolling structure is evenly distributed between the display screen and the grating.

13. The display device claimed as claim 1, wherein grain diameter of the rolling structure is on an order of micrometers.

14. The display device claimed as claim 1, wherein the push mechanism comprises:
a motor connected to the first and second mechanical arms, and configured to provide an action of the first and second mechanical arms with power.

15. The display device claimed as claim 14, wherein the push mechanism further comprises:
  a control circuit connected to the motor, and configured to control the motor to drive the first and second mechanical arms to push the grating and the display screen.

16. A driving method of a display device, for driving the display device claimed as claim 1, comprising:
  allowing the display device to stay in the first state when a dual viewing field display effect needs to be performed by the display device, the plurality of sub-pixels including first sub-pixels and second sub-pixels, applying signals that belong to different images to the first sub-pixels and the second sub-pixels, respectively; and
  allowing the display device to stay in the second state when an anti-spy display effect needs to be performed by the display device, applying signals that belong to a same image to the plurality of sub-pixels.

17. The display device claimed as claim 1, further comprising a filling liquid filled between the display screen and the grating, wherein a refractive index of the filling liquid is equal to a refractive index of glass.

\* \* \* \* \*